US011792129B2

(12) United States Patent
Li

(10) Patent No.: US 11,792,129 B2
(45) Date of Patent: Oct. 17, 2023

(54) DATA TRANSMISSION METHOD, DEVICE AND SYSTEM OF UNMANNED AERIAL VEHICLE SYSTEM AND GROUND IMAGE TRANSMISSION MODULE

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 334 days.

(21) Appl. No.: 17/142,674

(22) Filed: Jan. 6, 2021

(65) Prior Publication Data

US 2021/0126868 A1 Apr. 29, 2021

Related U.S. Application Data

(63) Continuation of application No. PCT/CN2018/109465, filed on Oct. 9, 2018.

(30) Foreign Application Priority Data

Jul. 13, 2018 (CN) .......................... 201810772483.5

(51) Int. Cl.
*H04L 47/22* (2022.01)
*H04B 7/185* (2006.01)
(Continued)

(52) U.S. Cl.
CPC .......... *H04L 47/22* (2013.01); *H04B 7/18506* (2013.01); *H04L 67/04* (2013.01); *H04L 67/06* (2013.01); *H04L 67/12* (2013.01)

(58) Field of Classification Search
CPC ......... H04L 47/22; H04L 67/04; H04L 67/06; H04L 67/12; H04L 47/225; H04L 47/29;
(Continued)

(56) References Cited

U.S. PATENT DOCUMENTS

2003/0081582 A1* 5/2003 Jain ....................... G06F 1/1626
370/352
2004/0221052 A1* 11/2004 Ramasubramanian .....................
H04L 12/427
709/230
(Continued)

FOREIGN PATENT DOCUMENTS

CN 103941745 A 7/2014
CN 105527954 A 4/2016
(Continued)

OTHER PUBLICATIONS

"IEEE Standard for a Framework for Structuring Low-Altitude Airspace for Unmanned Aerial Vehicle (UAV)"; IEEE STD 1939.1; Approved Sep. 2021 (Year: 2021).*
(Continued)

*Primary Examiner* — Benjamin H Elliott, IV

(57) ABSTRACT

A data transmission method of an unmanned aerial vehicle system and a ground image transmission module are provided. The data transmission method includes: receiving, by the ground image transmission module, at least two data packets sent in parallel by terminal equipment, each data packet in the at least two data packets corresponding to one module in the unmanned aerial vehicle system; respectively caching, by the ground image transmission module, each data packet in the at least two data packets into a buffer queue corresponding to each data packet; and transmitting, by the ground image transmission module, each of the data packets in the buffer queues to the module corresponding to the data packet through a communication channel between the modules corresponding to the data packets in the unmanned aerial vehicle system.

10 Claims, 10 Drawing Sheets

(51) Int. Cl.
*H04L 67/04* (2022.01)
*H04L 67/06* (2022.01)
*H04L 67/12* (2022.01)

(58) Field of Classification Search
CPC ........... H04B 7/18506; H04B 7/18504; H04W 28/14
See application file for complete search history.

(56) References Cited

U.S. PATENT DOCUMENTS

| | | | |
|---|---|---|---|
| 2014/0254693 A1* | 9/2014 | Mitchell | H04B 3/54 375/257 |
| 2017/0171319 A1* | 6/2017 | Hall | H04L 67/108 |
| 2020/0036644 A1* | 1/2020 | Belogolovy | H04L 1/0014 |
| 2021/0116907 A1* | 4/2021 | Altman | H04W 4/44 |
| 2021/0126868 A1* | 4/2021 | Li | H04L 67/04 |

FOREIGN PATENT DOCUMENTS

| | | |
|---|---|---|
| CN | 105827384 A | 8/2016 |
| WO | 2016/116841 A1 | 7/2016 |

OTHER PUBLICATIONS

"Performance Measurement of 802.11a Wireless Links from UAV to Ground Nodes with Various Antenna Orientations"; Cheng et al..; Proceedings of 15th International Conference on Computer Communications and Networks; Oct. 9-11, 2006 (Year: 2006).*

"UAV-Enabled Multiple Traffic Backhaul Based on Multiple RANs: A Batch-Arrival-Queuing-Inspired Approach"; Zhang et al.; IEEE Access, vol. 7; Nov. 5, 2019 (Year: 2019).*

English Translation ISR for PCT/CN2018/109465; Apr. 17, 2019 (Year: 2019).*

International Search Report dated Apr. 17, 2019; PCT/CN2018/109465.

* cited by examiner

DATA TRANSMISSION METHOD, DEVICE AND SYSTEM OF UNMANNED AERIAL VEHICLE SYSTEM AND GROUND IMAGE TRANSMISSION MODULE

This application is a continuation application of International Application No. PCT/CN2018/109465, filed on Oct. 9, 2018, which claims priority of Chinese Patent Application No. 201810772483.5, filed on Jul. 13, 2018, which is incorporated herein by reference in its entirely.

BACKGROUND

Technical Field

The embodiments of the present invention relate to the technical field of communications, in particular to a data transmission method, device and system of an unmanned aerial vehicle system and a ground image transmission module.

Related Art

FIG. 1 is a schematic diagram of an existing unmanned aerial vehicle system. As shown in FIG. 1, the unmanned aerial vehicle system is mainly divided into an airplane side and a ground side, the ground side being in wireless communication connection with the airplane side. When files need to be uploaded to the unmanned aerial vehicle system, for example, upgrading files, configuration files and the like are uploaded, terminal equipment is connected with a ground remote controller on the ground side of the unmanned aerial vehicle system.

As shown in FIG. 1, the unmanned aerial vehicle system has a plurality of modules, for example, the airplane side is provided with a camera, a pan-tilt, a vision module, four electronic speed controllers, an intelligent battery, an ultrasonic module, a flight control module, an airplane end image transmission module and the like, and the ground side is provided with a remote control single-chip computer, a ground image transmission module, a remote control panel and the like. Each module is an independent hardware and software system, all the modules being connected through serial ports or a network. Transmission bandwidths among links are different and fluctuate greatly. How to quickly and stably upload the files to each module of an unmanned aerial vehicle becomes a difficult problem in development.

SUMMARY

The embodiments of the present invention provide a data transmission method, device and system of an unmanned aerial vehicle system and a ground image transmission module.

According to a first aspect, the embodiments of the present invention provide a data transmission method of an unmanned aerial vehicle system, the data transmission includes:

receiving, by a ground image transmission module, at least two data packets sent in parallel by terminal equipment, each data packet in the at least two data packets being transmitted to one module in the unmanned aerial vehicle system;

respectively caching, by the ground image transmission module, each data packet in the at least two data packets into a buffer queue corresponding to each data packet; and transmitting, by the ground image transmission module, each of the data packets in the buffer queues to the module corresponding to the data packet through a communication channel between the modules corresponding to the data packets in the unmanned aerial vehicle system.

In one possible implementation of the first aspect, after respectively caching, by the ground image transmission module, each data packet in the at least two data packets into the buffer queue corresponding to each data packet, the data transmission method further includes:

sending, by the ground image transmission module, a transmission instruction to the terminal equipment according to a data size of the data packets cached in the buffer queues, so that the terminal equipment adjusts a transmission rate of the data packets corresponding to the buffer queues according to the transmission instruction.

In another possible implementation of the first aspect, the step of sending, by the ground image transmission module, the transmission instruction to the terminal equipment according to the data size of the data packets cached in the buffer queues includes:

judging whether the data size of the data packets cached in the buffer queues is greater than a first threshold value or not;

in response to the data size of the data packets cached in the buffer queues is greater than or equal to the first threshold value, sending, by the ground image transmission module, a first transmission instruction to the terminal equipment, so that the terminal equipment reduces the transmission rate of the data packets corresponding to the buffer queues to be within a first rate range according to the first transmission instruction; and in response to the data size of the data packets cached in the buffer queues is smaller than the first threshold value, sending, by the ground image transmission module, a second transmission instruction to the terminal equipment, so that the terminal equipment increases the transmission rate of the data packets corresponding to the buffer queues to be within a second rate range according to the second transmission instruction.

In another possible implementation of the first aspect, the data transmission method further includes:

in response to the data size of the data packets cached in the buffer queues is smaller than the first threshold value, judging whether the data size of the data packets cached in the buffer queues is greater than a second threshold value or not; and in response to the data size of the data packets cached in the buffer queues is greater than or equal to the second threshold value, sending, by the ground image transmission module, a third transmission instruction to the terminal equipment, so that the terminal equipment reduces the transmission rate of the data packets corresponding to the buffer queues to be within a third rate range according to the third transmission instruction, wherein the second threshold value is greater than the first threshold value and the maximum value of the third rate range is smaller than the minimum value of the first rate range.

In another possible implementation of the first aspect, the data transmission method further includes: judging whether the data size of the data packets cached in the buffer queues and a data size at the previous moment in the buffer queues are in the same threshold range or not; and if not, judging whether the data size of the data packets cached in the buffer queues is greater than the first threshold value or not.

In another possible implementation of the first aspect, the data transmission method further includes: in response to the data size of the data packets cached in the buffer queues is smaller than the first threshold value and the data size at the previous moment in the buffer queues is greater than or equal to the first threshold value, sending, by the ground image transmission module, the second transmission instruction to the terminal equipment, so that the terminal equipment increases the transmission rate of the data packets corresponding to the buffer queues to be within the second rate range according to the second transmission instruction.

In another possible implementation of the first aspect, the data transmission method further includes: in response to the data size of the data packets cached in the buffer queues is greater than a third threshold value and the data size at the previous moment in the buffer queues is smaller than or equal to the third threshold value, or the data size of the data packets cached in the buffer queues is smaller than a fourth threshold value and the data size at the previous moment in the buffer queues is greater than or equal to the fourth threshold value, sending, by the ground image transmission module, the first transmission instruction to the terminal equipment, so that the terminal equipment reduces the transmission rate of the data packets corresponding to the buffer queues to be within the first rate range according to the first transmission instruction.

In another possible implementation of the first aspect, the step of receiving, by the ground image transmission module, the at least two data packets sent in parallel by the terminal equipment includes:

receiving, by the ground image transmission module, the at least two data packets sent in parallel by the terminal equipment through a USB channel.

According to a second aspect, the embodiments of the present invention provide a ground image transmission module, which includes:

a memory, configured to store a computer program; and
a processor, configured to execute the computer program to implement the data transmission method of the unmanned aerial vehicle system as described in the first aspect.

According to a third aspect, the embodiments of the present invention provide a data uploading system of an unmanned aerial vehicle, the data uploading system including terminal equipment and an unmanned aerial vehicle system in communication connection, the unmanned aerial vehicle system including a ground system and an airplane system in communication connection and the ground system including the ground image transmission module as described in the second aspect.

According to the data transmission method, device and system of the unmanned aerial vehicle system and the ground image transmission module provided by the embodiments of the present invention, the transmission of the data packets corresponding to the modules is rapidly realized by utilizing the link bandwidth between the terminal equipment and the ground image transmission module as well as the link bandwidth between the modules.

BRIEF DESCRIPTION OF THE DRAWINGS

To describe the technical solutions in the embodiments of the present invention or in the prior art clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly and thoroughly describes the technical solutions in the embodiments of the present invention with reference to the accompanying drawings in the embodiments of the present invention. Apparently, the described embodiments are merely some embodiments of the present invention rather than all of the embodiments. All other embodiments obtained by a person of ordinary skill in the art based on the embodiments of the present invention without creative effects shall fall within the protection scope of the present invention.

The technical solutions provided by the embodiments of the present invention are suitable for the scene that terminal equipment sends data to an unmanned aerial vehicle system.

According to the technical solutions of the embodiments, a ground image transmission module is directly connected with the terminal equipment, so that the ground image transmission module receives data packets of modules of the unmanned aerial vehicle system sent in parallel by the terminal equipment and sends the data packets to the corresponding modules through a communication channel between the modules, and thus the bandwidth of each link is fully utilized in the shortest time, and data transmission is rapidly completed.

Meanwhile, according to a method provided by the embodiments, the best rate may be selected in real time for data transmission according to the current bandwidth state, the transmission rate being automatically changed according to the current bandwidth fluctuation and the problem of transmission rate switching oscillation not being introduced.

The following describes technical solutions of the present invention in detail with reference to specific embodiments. The following specific embodiments may be combined with each other, and the same or similar concepts or processes may not be repeated in some embodiments.

Figure 2:
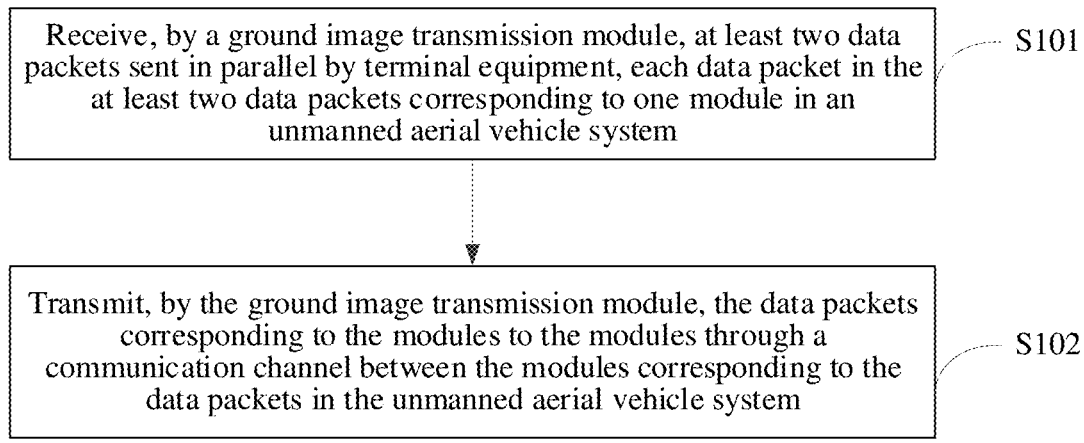
FIG. 2 is a flow chart of a data transmission method of an unmanned aerial vehicle system according to a first embodiment of the present invention.

FIG. 2 is a flow chart of a data transmission method of an unmanned aerial vehicle system according to a first embodiment of the present invention. As shown in FIG. 2, the method of the embodiment may include:

S101, a ground image transmission module receives at least two data packets sent in parallel by terminal equipment, each data packet in the at least two data packets corresponding to one module in the unmanned aerial vehicle system.

An execution main body of the embodiment is the ground image transmission module in the unmanned aerial vehicle system, and the ground image transmission module is configured to achieve communication connection with an image transmission module in an unmanned aerial vehicle so as to send instructions or information to the unmanned aerial vehicle or receive data (such as image data) and the like from the unmanned aerial vehicle. The ground image transmission module may be configured in a ground side (or called a remote control device, a ground remote controller, etc.).

The terminal equipment of the embodiment may be a smart phone, a desktop computer, a notebook computer and other terminal equipment which can be interacted with the unmanned aerial vehicle system. The terminal equipment can realize communication connection with the ground image transmission module through a communication interface on the ground side. The communication interface may be a wired or wireless communication interface. Specifically, the ground side can receive data transmitted by the terminal equipment through the communication interface, and then the communication interface can transmit the data to the ground image transmission module. Or, the terminal equipment is in direct communication connection with the ground image transmission module, which is not limited thereto.

Figure 1:
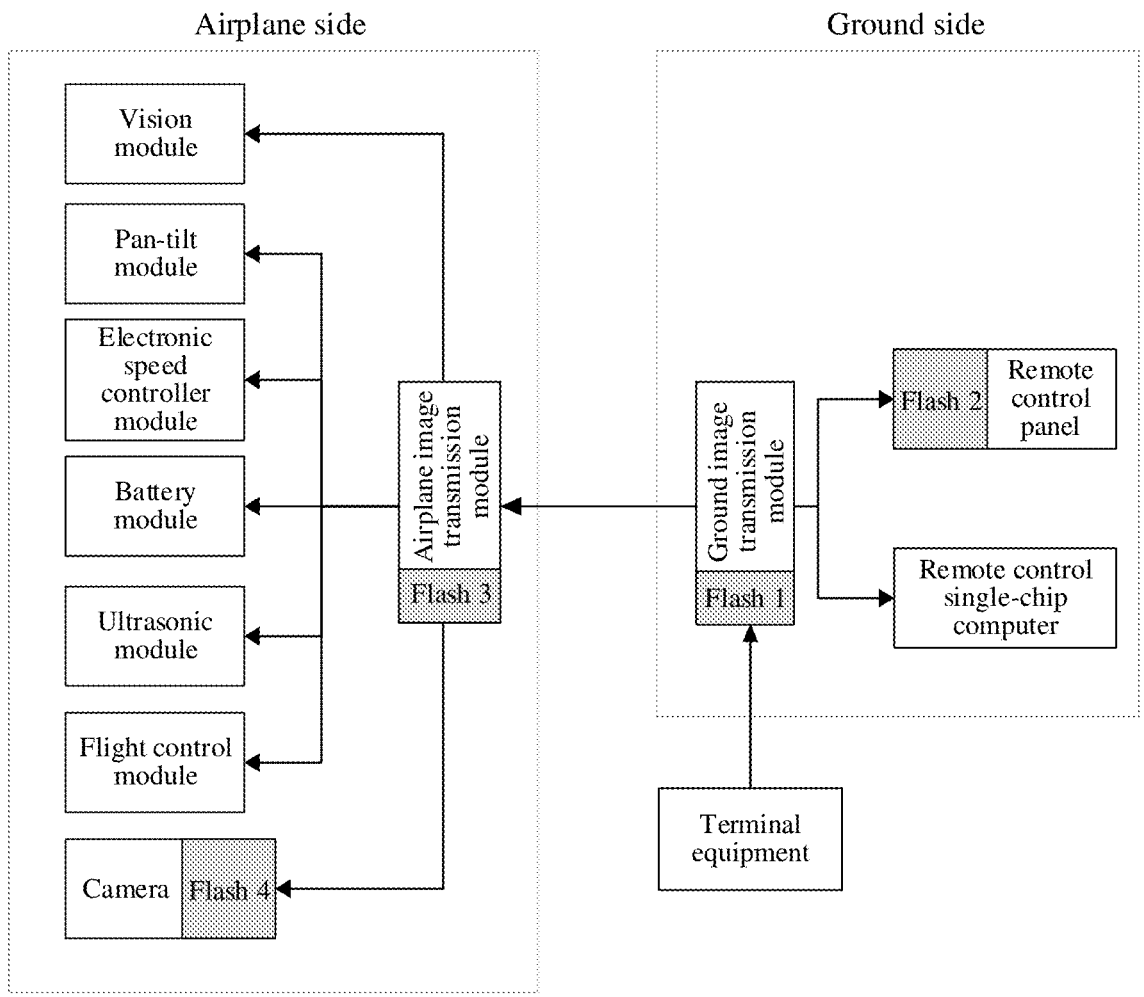
FIG. 1 is a schematic diagram of an existing unmanned aerial vehicle system.

As shown in FIG. 1, an unmanned aerial vehicle system in the embodiment may include an unmanned aerial vehicle side and a ground side. The ground side further includes a plurality of modules, such as a remote control panel, in addition to a ground image transmission module; the unmanned aerial vehicle side may include an airplane image transmission module, a camera module and the like; and the modules can be realized by combining hardware with software.

Optionally, the ground image transmission module and the terminal equipment of the embodiment may communicate through a wired connection or a wireless connection.

The data packets sent by the terminal equipment of the embodiment may be upgrading file data, configuration file data and the like of the modules.

In the embodiment, one data packet corresponds to one module in the unmanned aerial vehicle system, for example, each data packet includes an identification of the corresponding module, and the module corresponding to the data packet can be known according to the identification.

In the embodiment, the ground image transmission module receives at least two data packets transmitted in parallel by the terminal equipment.

In one implementation, a plurality of communication channels may be established between the terminal equipment and the ground image transmission module, and the terminal equipment and the ground image transmission module respectively establish threads with the same number as the communication channels so as to utilize the plurality of communication channels to transmit data in parallel. For example, the terminal equipment and the ground image transmission module may be connected through a Universal Serial Bus (USB). The terminal equipment may transmit the plurality of data packets to the ground image transmission module in parallel by using the plurality of communication channels, so that the transmission efficiency is improved. For example, the terminal equipment may transmit a ground image transmission data packet, a remote control panel data packet, an airplane image transmission data packet and a camera data packet by using the plurality of communication channels respectively. Each data packet is transmitted through one communication channel. Herein, a plurality refers to at least two.

Optionally, the data packets of the embodiment may be downloaded from a network side by the terminal equipment, for example, when a camera in the unmanned aerial vehicle system needs to be upgraded, the terminal equipment downloads the latest upgrading file data packet of the camera from the network side and transmits the upgrading file data packet to the ground image transmission module.

In one possible implementation of the embodiment, the above-mentioned S101 may include:

the ground image transmission module receives at least two data packets sent in parallel by the terminal equipment through a USB channel.

Due to the fact that the bandwidth of the USB (Universal Serial Bus) channel is large, the terminal equipment may send the data packet of each module to the ground image transmission module in parallel through the USB channel.

For example, the terminal equipment sends data packets of the camera, a vision module, the remote control panel and a flight control module of the unmanned aerial vehicle system in parallel, at the moment, the ground image transmission module can establish four threads, the data packet of the camera sent by the terminal equipment is received on the first thread, the data packet of the vision module sent by the terminal equipment is received on the second thread, the data packet of the remote control panel is received on the third thread, and the data packet of the flight control module is received on the fourth thread; and the four threads are executed in parallel, so that the receiving rate of the data packets is improved, and the bandwidth advantage of the USB channel is fully utilized.

S102, the ground image transmission module transmits the data packets corresponding to the modules to the modules through the communication channel between the modules corresponding to the data packets in the unmanned aerial vehicle system.

As shown in FIG. 1, the modules in the unmanned aerial vehicle system are in communication connection, for example, the camera is in communication connection with the airplane image transmission module through an Ethernet, and the airplane image transmission module being in communication connection with the ground image transmission module through a wireless network.

Thus, after the ground image transmission module receives the at least two data packets sent in parallel by the terminal equipment, the ground image transmission module transmits the data packets of the modules to the modules through the communication channel between the modules corresponding to the data packets in the unmanned aerial vehicle system.

For example, the ground image transmission module receives the data packet of the camera and the data packet of the remote control panel sent in parallel by the terminal equipment, the ground image transmission module sends the data packet of the camera to the airplane image transmission module through a wireless network channel, and then the airplane image transmission module sends the data packet of the camera to the camera through an Ethernet channel. Meanwhile, the ground image transmission module sends the data packet of the remote control panel to the remote control panel through the Ethernet channel, so that distribution of the data packets is realized.

According to the data transmission method of the unmanned aerial vehicle system in the embodiment of the present invention, the ground image transmission module receives the at least two data packets sent in parallel by the terminal equipment, each data packet in the at least two data packets corresponding to one module in the unmanned aerial vehicle system; and then, the ground image transmission module transmits the data packets corresponding to the modules to the modules through the communication channel between the modules corresponding to the data packets in the unmanned aerial vehicle system. That is, according to the embodiment, the transmission of the data packets corresponding to the modules is rapidly realized by utilizing the link bandwidth between the terminal equipment and the ground image transmission module as well as the link bandwidth between the modules.

Figure 3:
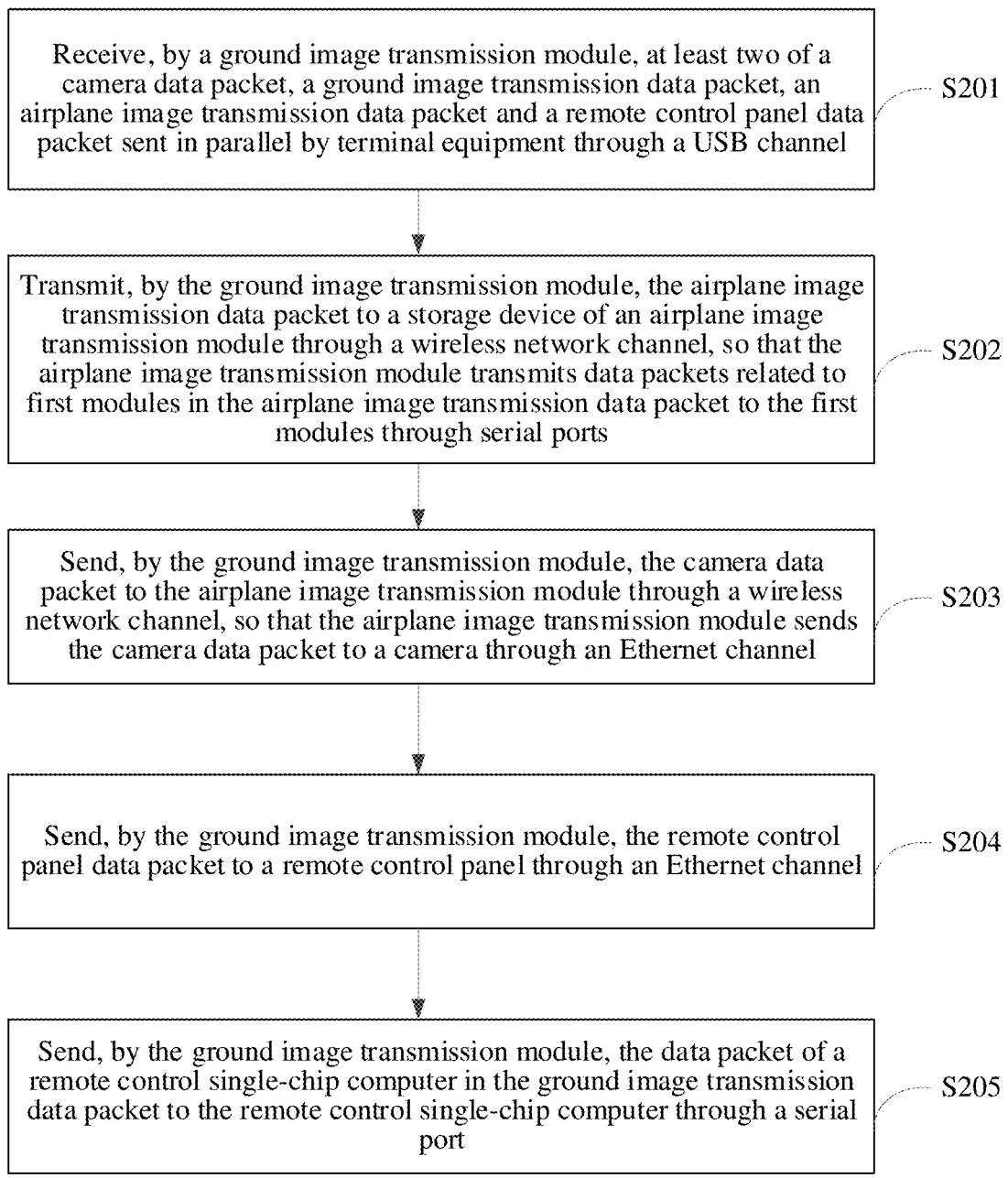
FIG. 3 is a flow chart of a data transmission method of an unmanned aerial vehicle system according to a second embodiment of the present invention.
Figure 4:
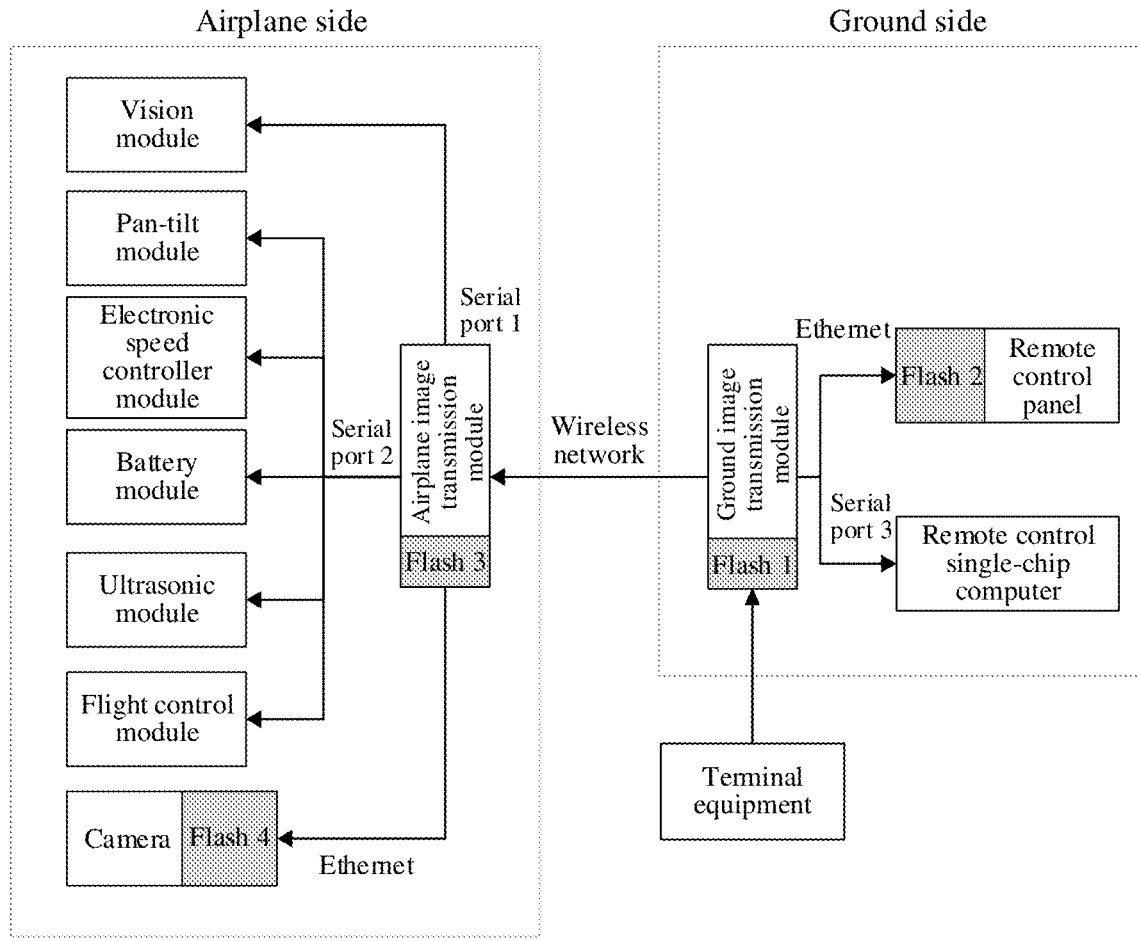
FIG. 4 is a schematic diagram of a data transmission flow of the unmanned aerial vehicle system involved in the second embodiment of the present invention.
Figure 5:
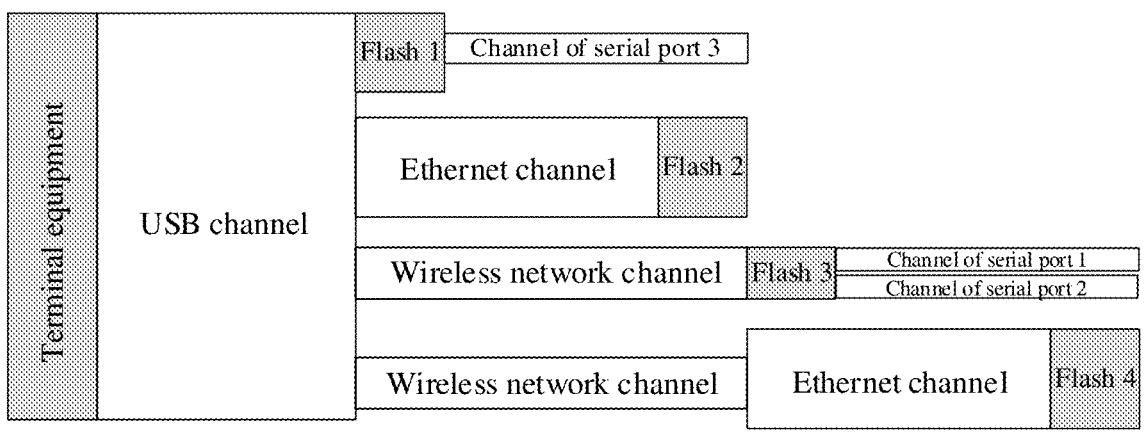
FIG. 5 is a schematic comparison diagram of bandwidths of channels between modules involved in the second embodiment of the present invention.

FIG. 3 is a flow chart of a data transmission method of an unmanned aerial vehicle system according to a second embodiment of the present invention. FIG. 4 is a schematic diagram of connection channels between modules in the unmanned aerial vehicle system involved in the second embodiment of the present invention. FIG. 5 is a schematic comparison diagram of bandwidths of channels between the modules involved in the second embodiment of the present invention.

As shown in FIG. 4, the modules in the unmanned aerial vehicle system of the embodiment include a ground image transmission module, a remote control panel, a remote control single-chip computer, an airplane image transmission module, a vision module, a camera and at least one first module which are in communication connection, each first module being in communication connection with the airplane image transmission module through a serial port.

As shown in FIG. 4, each first module may be any of a pan-tilt module, an electronic speed controller module, a battery module, an ultrasonic module and a flight control module.

As shown in FIG. 3, at the moment, the step that the ground image transmission module receives the at least two data packets sent in parallel by the terminal equipment through the USB channel as described above may be replaced with the following S201.

S201, the ground image transmission module receives at least two of a camera data packet, a ground image transmission data packet, an airplane image transmission data packet and a remote control panel data packet sent in parallel by terminal equipment through a USB channel.

The ground image transmission data packet may include a data packet of the ground image transmission module and/or a data packet of the remote control single-chip computer, and the airplane image transmission data packet may include at least one of a data packet of the vision module, a data packet of the airplane image transmission module and a data packet of each first module.

Specifically, the terminal equipment establishes four threads to send four data packets in parallel through the USB channel, the four data packets being respectively the camera data packet, the ground image transmission data packet, the airplane image transmission data packet and the remote control panel data packet. Correspondingly, the ground image transmission module establishes four threads to receive the above four file data sent by the USB channel in parallel.

Corresponding to the above S102, the following S202, S203, S204 and S205 may be included. In the embodiment, there is no precedence among S202, S203, S204 and S205, which may be performed in parallel without interfering with each other.

S202, the ground image transmission module transmits the airplane image transmission data packet to a storage device of the airplane image transmission module through a wireless network channel, so that the airplane image transmission module transmits the data packets related to the first modules in the airplane image transmission data packet to the first modules through the serial ports.

S203, the ground image transmission module sends the camera data packet to the airplane image transmission module through a wireless network channel, so that the airplane image transmission module sends the camera data packet to the camera through an Ethernet channel.

S204, the ground image transmission module sends the remote control panel data packet to the remote control panel through an Ethernet channel.

S205, the ground image transmission module sends the data packet of the remote control single-chip computer in the ground image transmission data packet to the remote control single-chip computer through a serial port.

Specifically, as shown in FIG. 4 and FIG. 5, after the ground image transmission module receives each data packet from the USB in parallel through the four threads, the ground image transmission module may separate out the data packet of the ground image transmission module from the ground image transmission data packet, store the data packet of the ground image transmission module into a Flash 1 directly, separate out the data packet of the remote control single-chip computer from the ground image transmission data packet and send the data packet of the remote control single-chip computer to the remote control single-chip computer through a serial port 3.

The ground image transmission module sends the remote control panel data packet to the remote control panel through the Ethernet channel, and the remote control panel directly stores the remote control panel data packet into a Flash 2 after receiving the remote control panel data packet.

The ground image transmission module sends the airplane image transmission data packet to the airplane image transmission module through the wireless network channel, and the airplane image transmission module separates out the data packet of the airplane image transmission module from the airplane image transmission data packet and stores the data packet of the airplane image transmission module in a Flash 3. Then, the airplane image transmission module separates out the data packet of the vision module from the airplane image transmission data packet and sends the data packet of the vision module to the vision module through a serial port 1. Meanwhile, the airplane image transmission module separates out the data packets of the first modules such as the pan-tilt module, the electronic speed controller module, the battery module, the ultrasonic module and the flight control module from the airplane image transmission data packet and transmits the data packets of the first modules one by one in series through a serial port 2.

The ground image transmission module transmits the camera data packet to the airplane image transmission module through the wireless network channel, the airplane image transmission module transmits the camera data packet to the camera through the Ethernet channel, and the camera stores the camera data packet in a Flash 4 of the camera.

Each Flash in FIG. 5 is one implementation of a storage device in one module.

As shown in FIG. 5, for each communication link, the USB channel has the largest bandwidth, followed by the Ethernet channels and the wireless network channels, and the serial port channels have the smallest bandwidth.

According to the embodiment, in the above way, various bandwidths can be fully utilized in the shortest time, and file transmission is rapidly completed.

Figure 6:
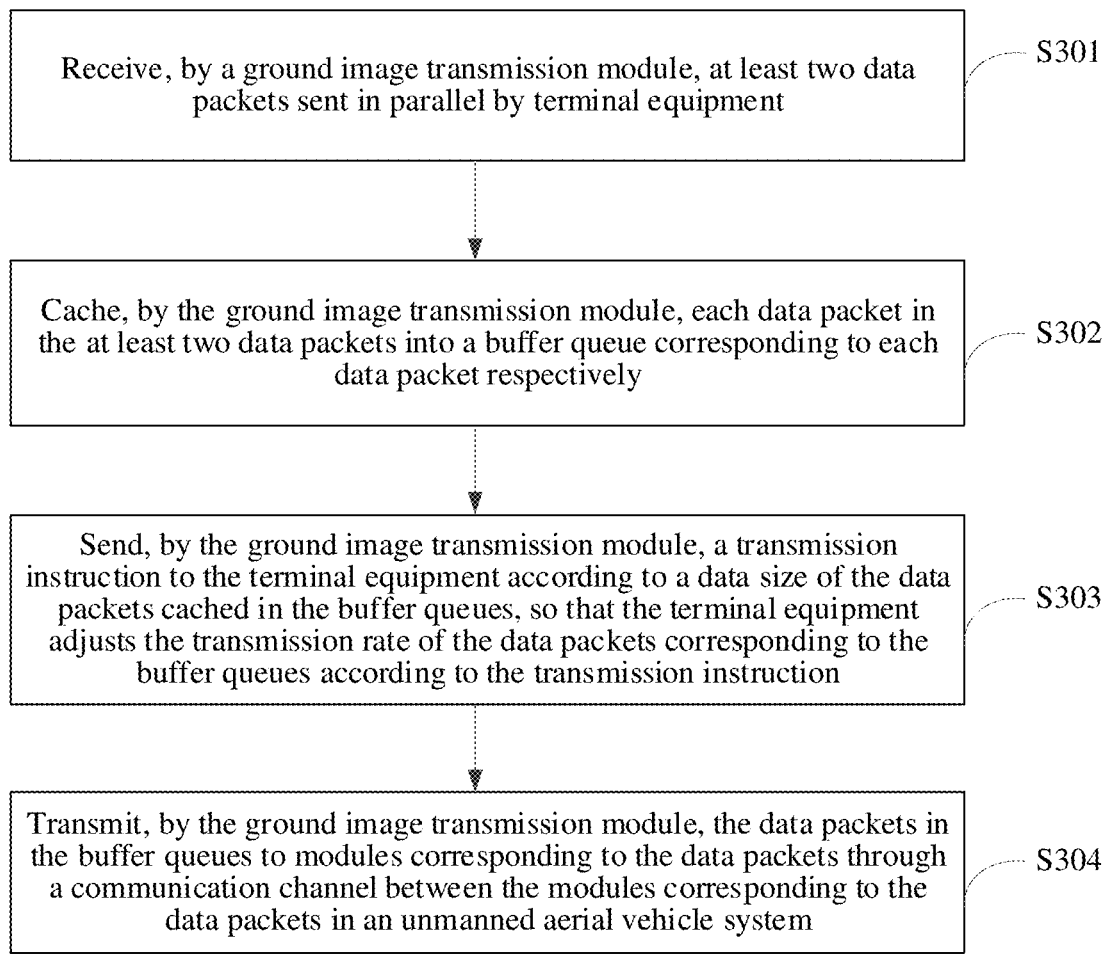
FIG. 6 is a flow chart of a data transmission method of an unmanned aerial vehicle system according to a third embodiment of the present invention.

FIG. 6 is a flow chart of a data transmission method of an unmanned aerial vehicle system according to a third embodiment of the present invention; and on the basis of the above-mentioned embodiment, the embodiment relates to an adjustment process of a transmission rate of terminal equipment. As shown in FIG. 6, the present embodiment may include:

S301, a ground image transmission module receives at least two data packets sent in parallel by the terminal equipment.

The specific implementation process of this step is described with reference to the above embodiments and will not be described in detail herein.

S302, the ground image transmission module caches each data packet in the at least two data packets into a buffer queue corresponding to each data packet respectively.

The ground image transmission module in the embodiment includes a plurality of buffer queues, and each data packet sent by the terminal equipment is stored in the buffer queue corresponding to each data packet, namely one data packet corresponds to one buffer queue. For example, each data packet is stored in the corresponding buffer queue of a FLASH in the ground image transmission module.

S303, the ground image transmission module sends a transmission instruction to the terminal equipment according to a data size of the data packets cached in the buffer queues, so that the terminal equipment adjusts a transmission rate of the data packets corresponding to the buffer queues according to the transmission instruction.

In practical application, when the bandwidth fluctuates, if a rapid transmission mode is adopted, the phenomenon of packet loss occurs, and if the transmission is too slow, the time is consumed. In order to solve the technical problems, the embodiment sends the transmission instruction to the terminal equipment according to the data size of the data packets by counting the data size of the data packets cached in each buffer queue so as to adjust the transmission rate of the terminal equipment.

For example, when the data size of the data packets cached in the buffer queues is greater than a certain threshold value, bandwidth insufficiency in the unmanned aerial vehicle system is indicated, and the ground image transmission module sends the transmission instruction to the terminal equipment. The transmission instruction is configured to indicate the terminal equipment to reduce the transmission rate of the data packets. When the data size of the data packets cached in the buffer queues is smaller than a certain threshold value, bandwidth sufficiency in the unmanned aerial vehicle system is indicated, and the ground image transmission module sends the transmission instruction to the terminal equipment. The transmission instruction is configured to indicate the terminal equipment to increase the transmission rate of the data packets.

The ground image transmission module in the embodiment can adjust the transmission rate of the terminal equipment for transmitting the data packets according to the data size of the data packets cached in the buffer queues, so that the terminal equipment selects the most appropriate rate to transmit the data packets, and the transmission efficiency of the data packets is improved.

Optionally, the terminal equipment in the embodiment may adjust the transmission rate of the data packets in such a way that the ground image transmission module carries the transmission rate of the data packets in the transmission instruction, and the terminal equipment directly adjusts the transmission rate of the data packets according to the transmission rate carried in the transmission instruction. Optionally, the transmission instruction is only configured to indicate the current data size of the ground image transmission module or only configured to indicate the terminal equipment to increase or reduce the transmission rate of the data packets, and the terminal equipment may also determine the transmission rate of the data packets according to the transmission instruction.

S304, the ground image transmission module transmits the data packets in the buffer queues to the modules corresponding to the data packets through a communication channel between the modules corresponding to the data packets in the unmanned aerial vehicle system.

Specifically, referring to the above example, the ground image transmission module receives a camera data packet, a ground image transmission data packet, an airplane image transmission data packet, a remote control panel data packet and the like sent by the terminal equipment through a USB channel in parallel, stores the data packets into the corresponding buffer queues and then transmits the data packets in the buffer queues to the modules corresponding to the data packets through the communication channel between the modules corresponding to the data packets in the unmanned aerial vehicle system.

For example, the ground image transmission module establishes four buffer queues, the first buffer queue is configured to buffer the camera data packet, the second buffer queue is configured to buffer the ground image transmission data packet, the third buffer queue is configured to buffer the airplane image transmission data packet, and the fourth buffer queue is configured to buffer the remote control panel data packet.

Then, as shown in FIG. 4, the ground image transmission module sends the camera data packet in the first buffer queue to the airplane image transmission module through the wireless network channel, so that the airplane image transmission module forwards the camera data packet to the camera through the Ethernet channel. The ground image transmission module transmits the remote control single-chip computer data packet in the ground image transmission data packet in the second buffer queue to the remote control single-chip computer through the serial port 3. The ground image transmission module transmits the airplane image transmission data packet in the third buffer queue to the airplane image transmission module through the wireless network channel. The ground image transmission module sends the remote control panel data packet in the fourth buffer queue to the remote control panel through the Ethernet channel.

According to the data transmission method of the unmanned aerial vehicle system provided by the embodiment, the ground image transmission module caches each data packet in at least two data packets into the buffer queue corresponding to each data packet; then, the ground image transmission module sends the transmission instruction to the terminal equipment according to the data size of the data packets cached in the buffer queues, so that the terminal equipment adjusts the transmission rate of the data packets corresponding to the buffer queues according to the transmission instruction; and then, the ground image transmission module transmits the data packets in the buffer queues to the modules corresponding to the data packets through the communication channel between the modules corresponding to the data packets in the unmanned aerial vehicle system. That is, according to the method of the embodiment, one buffer queue is arranged for each data packet in the ground image transmission module, and the transmission rate of the data packets transmitted by the terminal equipment is adjusted according to the data size cached in the buffer queues, so that the terminal equipment can automatically select the most appropriate rate to transmit the data packets in real time, and the transmission efficiency of the data packets is improved. Meanwhile, the transmission rate may automatically change according to the current bandwidth fluctuation, and the problem of data packet loss caused by transmission rate switching oscillation is avoided.

Figure 7:
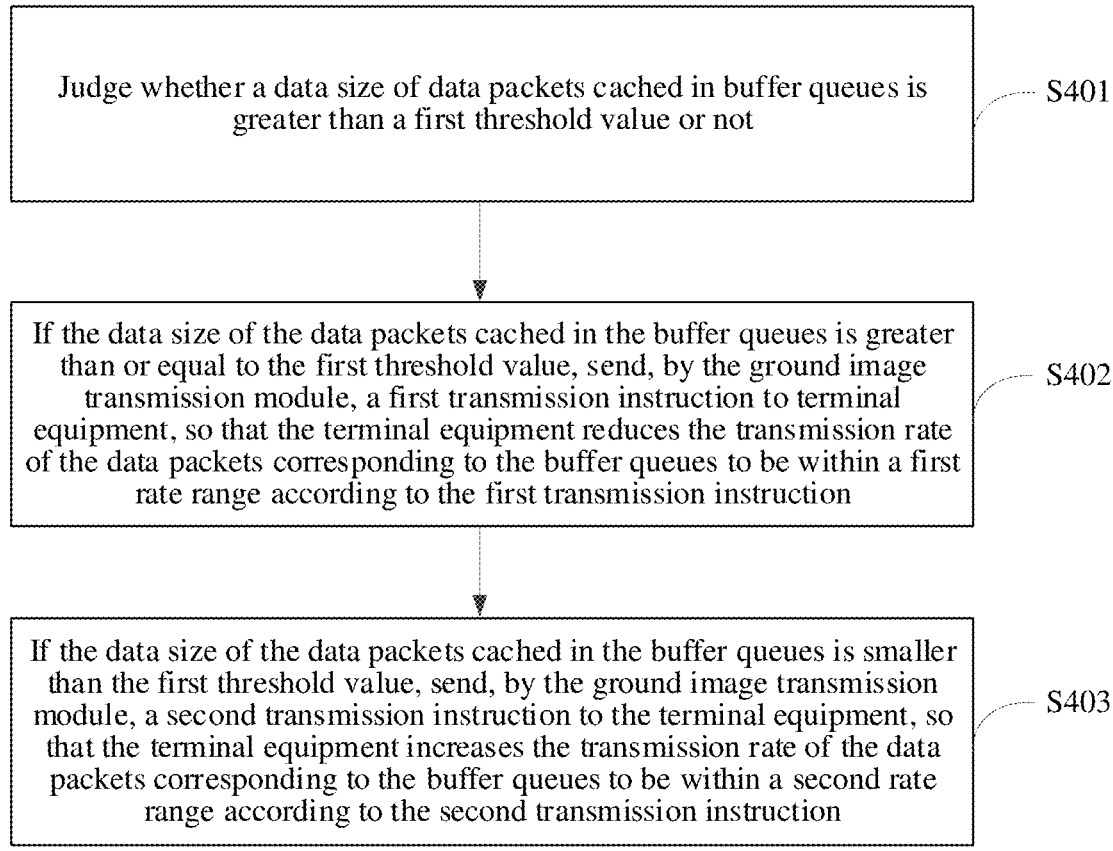
FIG. 7 is a flow chart of a data transmission method of an unmanned aerial vehicle system according to a fourth embodiment of the present invention.
Figure 8:
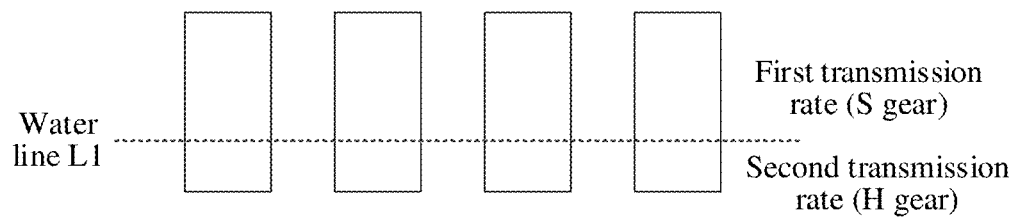
FIG. 8 is a schematic diagram of a buffer queue involved in the fourth embodiment.

FIG. 7 is a flow chart of a data transmission method of an unmanned aerial vehicle system according to a fourth embodiment of the present invention. FIG. 8 is a schematic diagram of a buffer queue involved in the fourth embodiment. On the basis of the above embodiments, this embodiment relates to a specific process that a ground image transmission module sends a transmission instruction to terminal equipment according to a data size of data packets cached in the buffer queues, and as shown in FIG. 7, the above S303 may include:

S401, whether the data size of the data packets cached in the buffer queues is greater than a first threshold value or not is judged.

S402, if the data size of the data packets cached in the buffer queues is greater than or equal to the first threshold value, the ground image transmission module sends a first transmission instruction to the terminal equipment, so that the terminal equipment reduces a transmission rate of the data packets corresponding to the buffer queues to be within a first rate range according to the first transmission instruction.

S403, if the data size of the data packets cached in the buffer queues is smaller than the first threshold value, the ground image transmission module sends a second transmission instruction to the terminal equipment, so that the terminal equipment increases the transmission rate of the data packets corresponding to the buffer queues to be within a second rate range according to the second transmission instruction.

Specifically, as shown in FIG. 8, it is assumed that the ground image transmission module includes four buffer queues, each of which is provided with one water line (e.g., water line $L_1$). In this way, the transmission rate may be divided into a high (H) gear and a slow (S) gear, which in turn correspond to a first transmission rate and a second transmission rate.

This embodiment is illustrated with one buffer queue as an example, to which other buffer queues can make reference.

The ground image transmission module counts the data size n of the data packets cached in the buffer queue, if the data size n is greater than the first threshold value L1, current bandwidth insufficiency of the unmanned aerial vehicle system is indicated, the transmission instruction is sent to the terminal equipment, the terminal equipment is informed to enter the S gear, and data is sent at a slower rate. That is, the ground image transmission module sends the first transmission instruction to the terminal equipment, so that the terminal equipment reduces the transmission rate of the data packets corresponding to the buffer queue to be within the first rate range (i.e. the rate range corresponding to the S gear) according to the first transmission instruction.

If the data size n of the data packets cached in the buffer queue is smaller than the first threshold value L1, current bandwidth sufficiency of the unmanned aerial vehicle system is indicated, the terminal equipment is informed to enter the H gear, and data is sent at a faster rate. That is, the ground image transmission module sends the second transmission instruction to the terminal equipment, so that the terminal equipment increases the transmission rate of the data packets corresponding to the buffer queue to be within the second rate range (i.e. the rate range corresponding to the H gear) according to the second transmission instruction.

In this embodiment, the second transmission rate>the first transmission rate.

In one possible implementation of the embodiment, after the above S401, the method of the embodiment further includes:

If the data size in the buffer queues is greater than the first threshold value, whether the data size of the data packets cached in the buffer queues is greater than a second threshold value or not is judged.

If the data size of the data packets cached in the buffer queues is greater than or equal to the second threshold value, the ground image transmission module sends a third transmission instruction to the terminal equipment, so that the terminal equipment reduces the transmission rate of the data packets corresponding to the buffer queues to be within a third rate range according to the third transmission instruction, wherein the second threshold value is greater than the first threshold value, and a maximum value of the third rate range is smaller than a minimum value of the first rate range.

Figure 9:
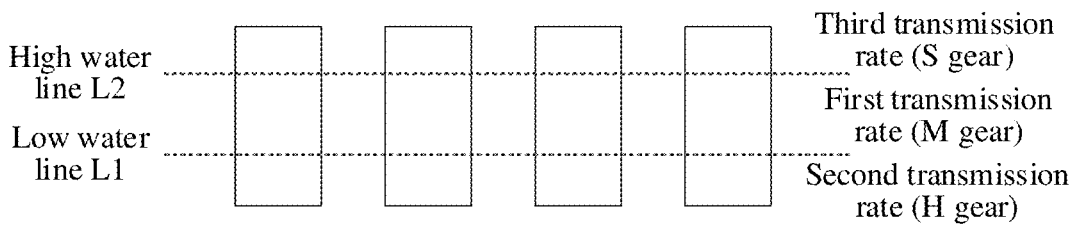
FIG. 9 is a schematic diagram of another buffer queue involved in the fourth embodiment.

Specifically, as shown in FIG. 9, it is assumed that the ground image transmission module includes four buffer queues, each of the buffer queues is provided with two water lines (high water line $L_2$ and low water line $L_1$). Thus, the transmission rate may be divided into a high (H) gear, a medium (M) gear and a slow (S) gear, which in turn correspond to a third transmission rate, a second transmission rate and a first transmission rate.

This embodiment is illustrated with one buffer queue as an example, to which other buffer queues can make reference.

The ground image transmission module counts the data size n of the data packets cached in the buffer queue, if the data size n is greater than the first threshold value L1 and greater than the second threshold value L2, severe current bandwidth insufficiency of the unmanned aerial vehicle system is indicated, the terminal equipment is informed to enter the S gear, and data is transmitted at a slower rate. That is, the ground image transmission module sends the third transmission instruction to the terminal equipment, so that the terminal equipment reduces the transmission rate of the data packets corresponding to the buffer queue to be within the third rate range (i.e. the rate range corresponding to the S gear) according to the third transmission instruction.

If the data size n of the data packets cached in the buffer queue is greater than the first threshold value L1 and smaller than the second threshold value L2, namely L1<n<L2, it is indicated that the current bandwidth of the unmanned aerial vehicle system is in a normal state, the terminal equipment is informed to enter the M gear, and data is sent at the first transmission rate. That is, as shown in FIG. 9, when each queue is provided with two water lines, the first transmission rate corresponds to the M gear.

In the embodiment, the second threshold value is greater than the first threshold value, and the second transmission rate>the first transmission rate>the third transmission rate.

According to the data transmission method of the unmanned aerial vehicle system provided by the embodiment of the present invention, the terminal equipment is indicated to use three different transmission rates to transmit the data packets according to the data size of the data packets cached in the buffer queue, automatic adjustment of the transmission rate is achieved, and thus the problem of transmission packet loss and the like caused by bandwidth fluctuation is avoided.

Figure 10:
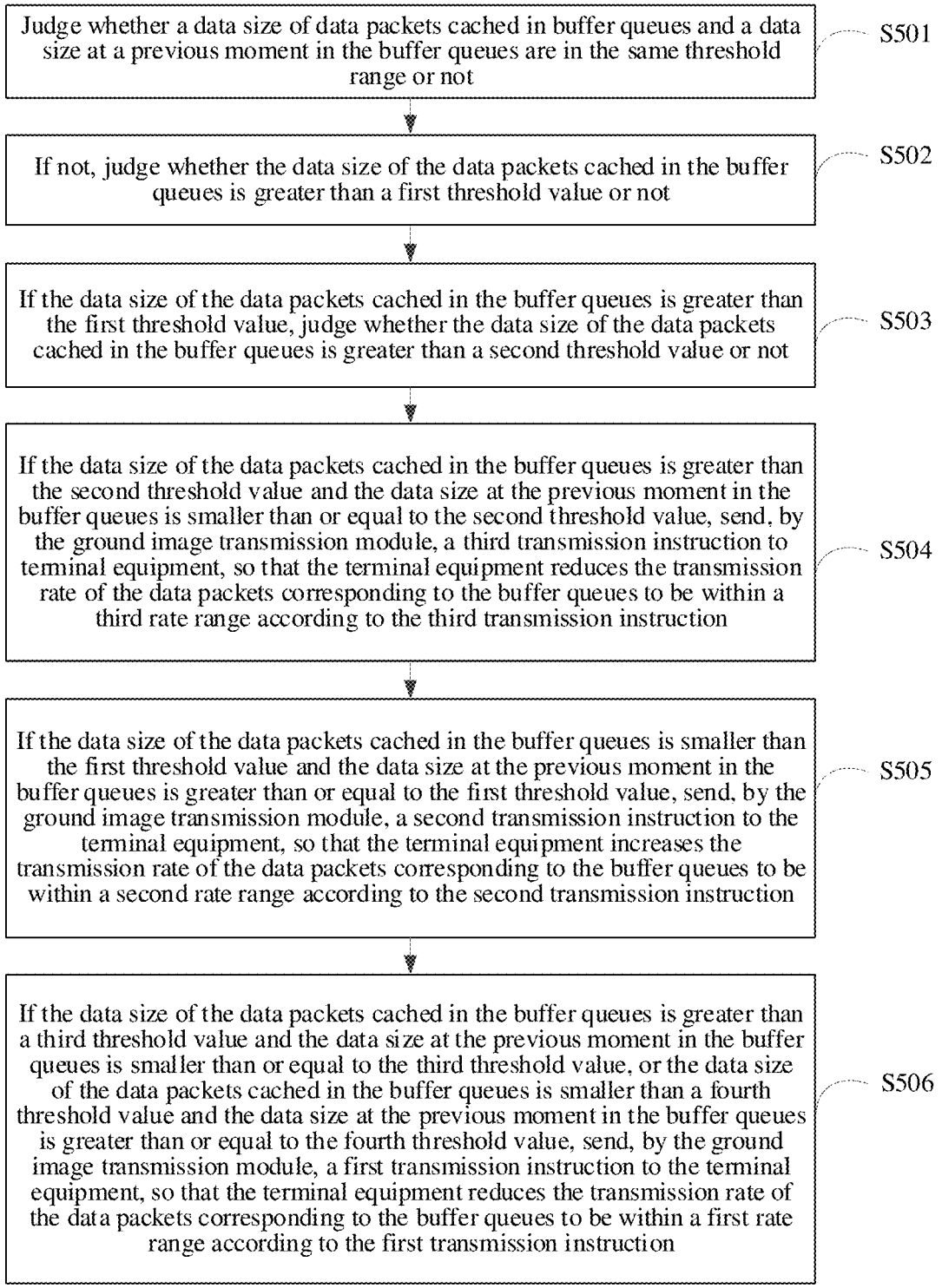
FIG. 10 is a flow chart of a data transmission method of an unmanned aerial vehicle system according to a fifth embodiment of the present invention.
Figure 11:
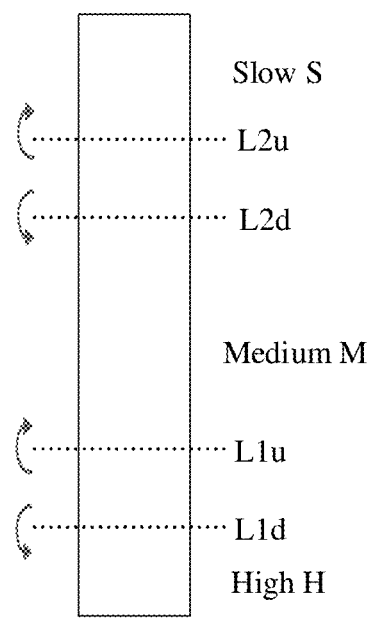
FIG. 11 is a schematic diagram of a buffer queue involved in the fifth embodiment.

FIG. 10 is a flow chart of a data transmission method of an unmanned aerial vehicle system according to a fifth embodiment of the present invention. FIG. 11 is a schematic diagram of a buffer queue involved in the fifth embodiment. On the basis of the above embodiment, as shown in FIG. 10, the data transmission method of the embodiment further includes:

S501, whether the data size of the data packets cached in the buffer queues and a data size at a previous moment in the buffer queues are in the same threshold range or not is judged.

In this embodiment, the data size in the buffer queues may be counted periodically, and at the moment, the previous moment may be understood as the last sampling period.

Optionally, the previous moment in this embodiment may be a time point at which the data size in the buffer queues is last counted.

S502, if not, whether the data size of the data packets cached in the buffer queues is greater than the first threshold value or not is judged.

S503, if the data size of the data packets cached in the buffer queues is greater than the first threshold value, whether the data size of the data packets cached in the buffer queues is greater than a second threshold value or not is judged.

S504, if the data size of the data packets cached in the buffer queues is greater than the second threshold value and the data size at the previous moment in the buffer queues is smaller than or equal to the second threshold value, the ground image transmission module sends the third transmission instruction to the terminal equipment, so that the terminal equipment reduces the transmission rate of the data packets corresponding to the buffer queues to be within the third rate range according to the third transmission instruction.

S505, if the data size of the data packets cached in the buffer queues is smaller than the first threshold value and the data size at the previous moment in the buffer queues is greater than or equal to the first threshold value, the ground image transmission module sends the second transmission instruction to the terminal equipment, so that the terminal equipment increases the transmission rate of the data packets corresponding to the buffer queues to be within the second rate range according to the second transmission instruction.

The second transmission rate is greater than the first transmission rate, and the second threshold value is smaller than the first threshold value.

S506, if the data size of the data packets cached in the buffer queues is greater than a third threshold value and the data size at the previous moment in the buffer queues is smaller than or equal to the third threshold value, or the data size of the data packets cached in the buffer queues is smaller than a fourth threshold value and the data size at the previous moment in the buffer queues is greater than or equal to the fourth threshold value, the ground image transmission module sends the first transmission instruction to the terminal equipment, so that the terminal equipment reduces the transmission rate of the data packets corresponding to the buffer queues to be within the first rate range according to the first transmission instruction.

A third transmission rate is smaller than the first transmission rate, the third threshold value is greater than the first threshold value and smaller than the fourth threshold value, and the fourth threshold value is smaller than the second threshold value.

Specifically, in order to prevent the problem of repeated oscillation at the water line, as shown in FIG. 11, the water lines $L_1$ and $L_2$ in FIG. 9 are corrected to $L_{1u}$, $L_{1d}$, $L_{2u}$, $L_{2d}$, wherein $L_{1d}<L_1<L_{1u}$, $L_{2d}<L_2<L_{2u}$. The transmission rate is still divided into a high (H) gear, a medium (M) gear and a slow (S) gear.

It is assumed that the data size of the data packets cached at the current moment in the buffer queues is L, and the data size of the data packets cached at the previous moment in the buffer queues is $L_o$.

This embodiment is illustrated with one buffer queue as an example, to which other buffer queues can make reference.

Firstly, the ground image transmission module counts the data size L of the data packets cached at the current moment in the buffer queue and the data size $L_o$ of the data packets cached at the previous moment.

If the data size L at the current moment in the buffer queue is greater than the second threshold value $L_{2u}$, and the data size $L_o$ at the previous moment in the buffer queue is smaller than or equal to $L_{2u}$, i.e. $L>L_{2u}$ and $L_o<L_{2u}$, severe current bandwidth insufficiency of the unmanned aerial vehicle system is indicated, the terminal equipment is informed to enter the S gear and data is sent at a slower rate. That is, the ground image transmission module sends the third transmission instruction to the terminal equipment, so that the terminal equipment reduces the transmission rate of the data packets corresponding to the buffer queue to be within the third rate range (i.e. the rate range corresponding to the S gear) according to the third transmission instruction.

If the data size L at the current moment in the buffer queue is smaller than the first threshold value $L_{1d}$, and the data size $L_o$ at the previous moment in the buffer queue is greater than or equal to the first threshold value $L_{1d}$, i.e. $L<L_{1d}$ and $L_o \geq L_{1d}$, current bandwidth sufficiency of the unmanned aerial vehicle system is indicated, the terminal equipment is informed to enter the H gear, and data is sent at a higher rate. That is, the ground image transmission module sends the second transmission instruction to the terminal equipment, so that the terminal equipment increases the transmission rate of the data packets corresponding to the buffer queue to be within the second rate range (i.e. the rate range corresponding to the H gear) according to the second transmission instruction.

If the data size L at the current moment in the buffer queue is greater than the third threshold value $L_{2u}$, and the data size $L_o$ at the previous moment in the buffer queue is smaller than or equal to the third threshold value $L_{2u}$, i.e. $L > L_{2u}$ and $L_o \leq L_{2u}$, or the data size L at the current moment in the buffer queue is smaller than the fourth threshold value $L_{1d}$, and the data size $L_o$ at the previous moment in the buffer queue is greater than or equal to the fourth threshold value $L_{1d}$, i.e. $L < L_{1d}$ and $L_o \geq L_{1d}$, it is indicated that current bandwidth of the unmanned aerial vehicle system is in a normal state, the terminal equipment is informed to enter the M gear, and data is sent at a medium rate. That is, the ground image transmission module sends the first transmission instruction to the terminal equipment, so that the terminal equipment reduces the transmission rate of the data packets corresponding to the buffer queue to be within the first rate range (i.e. the rate range corresponding to the M gear) according to the first transmission instruction.

In the embodiment, the second transmission rate>the first transmission rate>the third transmission rate.

There is no precedence among the above S501, S502 and S503.

According to the data transmission method of the unmanned aerial vehicle system provided by the embodiment of the invention, according to the data size of the data packets cached at the current moment in the buffer queues and the data size of the data packets cached at the previous moment in the buffer queues, the terminal equipment is instructed to transmit the data packets by using three different transmission rates, the adjustment accuracy of the transmission rate is further improved, and the problem of oscillation generated in the transmission rate switching process is avoided.

Figure 12:
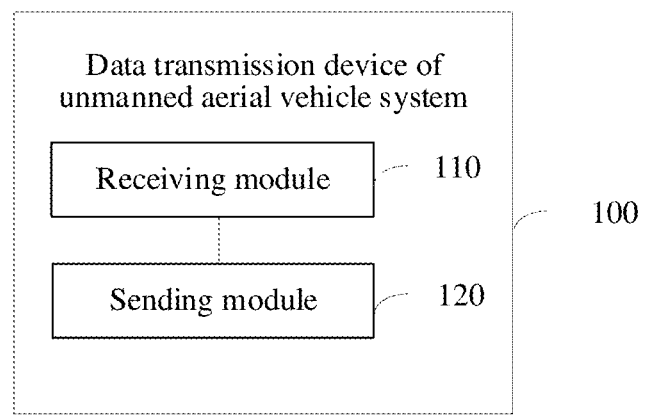
FIG. 12 is a schematic structure diagram of a data transmission device of the unmanned aerial vehicle system according to the first embodiment of the present invention.

FIG. 12 is a schematic structure diagram of a data transmission device of the unmanned aerial vehicle system according to the first embodiment of the present invention. As shown in FIG. 12, the data transmission device 100 of the unmanned aerial vehicle system of the embodiment may include:

a receiving module 110, configured to receive at least two data packets sent in parallel by terminal equipment, each data packet in the at least two data packets corresponding to one module in the unmanned aerial vehicle system; and a sending module 120, configured to transmit the data packets corresponding to the modules to the modules through a communication channel between the modules corresponding to the data packets in the unmanned aerial vehicle system.

The data transmission device of the unmanned aerial vehicle system according to the embodiment of the present invention may be configured to execute the technical solutions of the above method embodiments, the implementation principle and technical effects being similar and not repeated herein.

Figure 13:
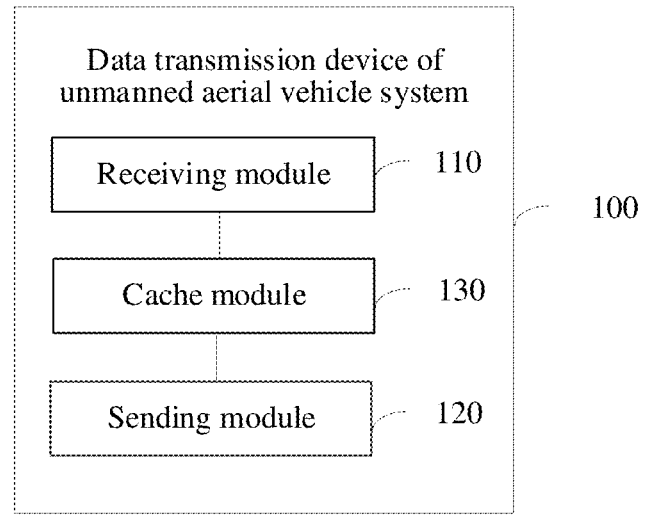
FIG. 13 is a schematic structure diagram of a data transmission device of the unmanned aerial vehicle system according to the second embodiment of the present invention.

FIG. 13 is a schematic structure diagram of a data transmission device of the unmanned aerial vehicle system according to the second embodiment of the present invention. On the basis of the above embodiment, as shown in FIG. 13, the data transmission device 100 of the unmanned aerial vehicle system of the embodiment may further include a cache module 130;

the cache module 130 is configured to respectively cache each data packet in the at least two data packets into a buffer queue corresponding to each data packet; and the sending module 120 is particularly configured to transmit the data packets in the buffer queues to the modules corresponding to the data packets through a communication channel between the modules corresponding to the data packets in the unmanned aerial vehicle system.

In one possible implementation of the embodiment, the sending module 120 is also configured to send a transmission instruction to terminal equipment according to a data size of the data packets cached in the buffer queues, so that the terminal equipment transmits the data packets of the modules according to a transmission rate indicated by the transmission instruction.

The data transmission device of the unmanned aerial vehicle system according to the embodiment of the present invention may be configured to execute the technical solutions of the above method embodiments, the implementation principle and technical effects being similar and not repeated herein.

Figure 14:
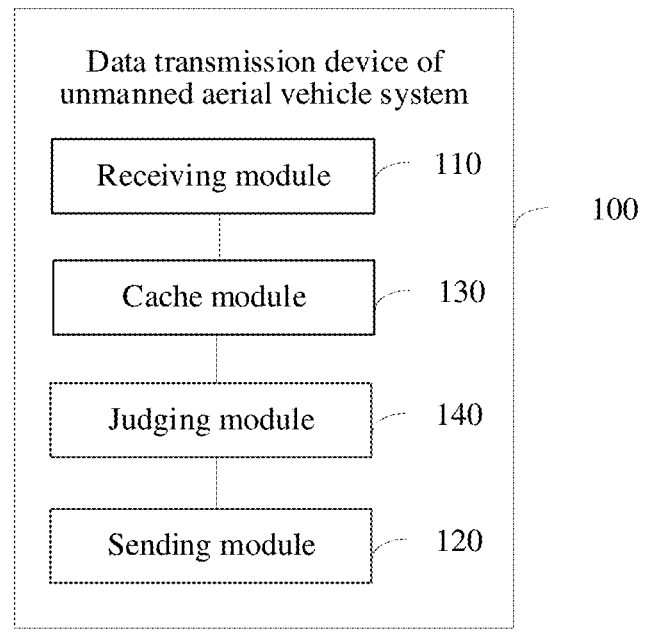
FIG. 14 is a schematic structure diagram of a data transmission device of the unmanned aerial vehicle system according to the third embodiment of the present invention.

FIG. 14 is a schematic structure diagram of a data transmission device of the unmanned aerial vehicle system according to the third embodiment of the present invention. On the basis of the above embodiment, as shown in FIG. 14, the data transmission device 100 of the unmanned aerial vehicle system of the embodiment may further include a judging module 140;

the judging module is configured to judge whether the data size of the data packets cached in the buffer queues is greater than a first threshold value or not; and the sending module 120 is particularly configured to send a first transmission instruction to the terminal equipment by a ground image transmission module if the data size of the data packets cached in the buffer queues is greater than or equal to the first threshold value, so that the terminal equipment reduces the transmission rate of the data packets corresponding to the buffer queues to be within a first rate range according to the first transmission instruction.

The sending module 120 is also particularly configured to send a second transmission instruction to the terminal equipment by the ground image transmission module if the data size of the data packets cached in the buffer queues is smaller than the first threshold value, so that the terminal equipment increases the transmission rate of the data packets corresponding to the buffer queues to be within a second rate range according to the second transmission instruction.

In one possible implementation of the embodiment, the judging module 140 is also configured to judge whether the data size of the data packets cached in the buffer queues is greater than a second threshold value or not if the data size of the data packets cached in the buffer queues is smaller than the first threshold value.

The sending module 120 is also particularly configured to send a third transmission instruction to the terminal equipment by the ground image transmission module if the data size of the data packets cached in the buffer queues is greater than or equal to the second threshold value, so that the terminal equipment reduces the transmission rate of the data packets corresponding to the buffer queues to be within a third rate range according to the third transmission instruction, wherein the second threshold value is greater than the first threshold value, and the maximum value of the third rate range is smaller than the minimum value of the first rate range.

In another possible implementation of the embodiment, the judging module 140 is also configured to judge whether the data size of the data packets cached in the buffer queues and a data size at a previous moment in the buffer queues are in the same threshold range or not, and if not, judge whether the data size of the data packets cached in the buffer queues is greater than the second threshold value or not.

In another possible implementation of the embodiment, the receiving module 110 is particularly configured to receive at least two data packets sent in parallel by the terminal equipment through a USB channel.

The data transmission device of the unmanned aerial vehicle system according to the embodiment of the present invention may be configured to execute the technical solutions of the above method embodiments, the implementation principle and technical effects being similar and not repeated herein.

Figure 15:
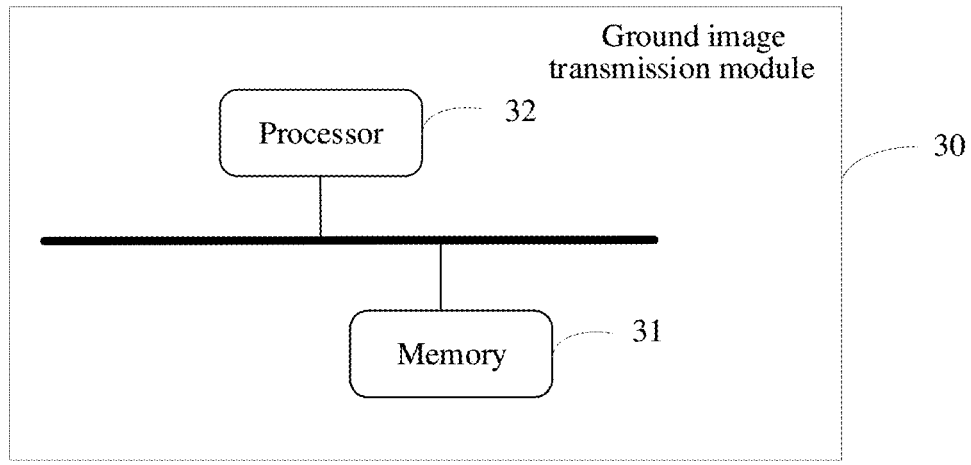
FIG. 15 is a schematic structure diagram of a ground image transmission module according to an embodiment of the present invention.

FIG. 15 is a schematic structure diagram of a ground image transmission module according to an embodiment of the present invention. As shown in FIG. 15, the ground image transmission module 30 of the embodiment includes:

a memory 31, configured to store a computer program; and a processor 32, configured to execute the computer program to implement the above data transmission methods of the unmanned aerial vehicle system, the implementation principle and technical effects being similar and not repeated herein.

Figure 16:
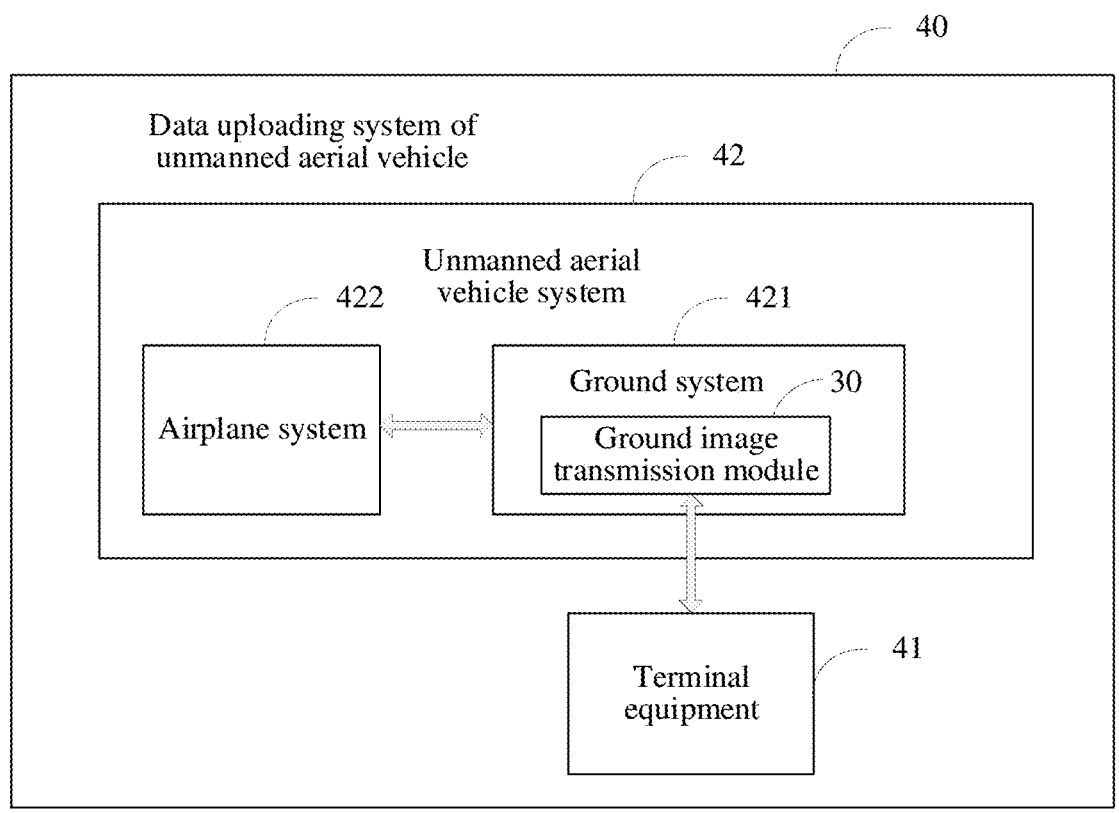
FIG. 16 is a schematic structure diagram of a data uploading system of an unmanned aerial vehicle according to an embodiment of the present invention.

FIG. 16 is a schematic structure diagram of a data uploading system of an unmanned aerial vehicle according to an embodiment of the present invention. As shown in FIG. 16, the data uploading system 40 of the unmanned aerial vehicle of the embodiment includes:

terminal equipment 41 and an unmanned aerial vehicle system 42 in communication connection, wherein the unmanned aerial vehicle system 42 includes a ground system 421 and an airplane system 422 in communication connection, and the ground system 421 includes the ground image transmission module 30 described in FIG. 14.

As shown in FIG. 16, the terminal equipment 41 and the ground image transmission module 30 of the embodiment are connected through a USB, and the ground image transmission module 30 may implement the data transmission methods of the unmanned aerial vehicle system in the above embodiments, the implementation principle and technical effects being similar and not repeated herein.

Furthermore, when at least part of functions of the data transmission methods of the unmanned aerial vehicle system according to the embodiments of the present invention are implemented by software, the embodiment of the present invention further provides a computer storage medium, the computer storage medium is configured to store a computer software instruction for uploading data of the above unmanned aerial vehicle, and when the computer software instruction is executed on a computer, various possible data transmission methods of the unmanned aerial vehicle system according to the above method embodiments are implemented by the computer. When the computer instruction is loaded and executed on the computer, all or some of the processes or functions according to the embodiments of the present invention are produced. The computer instruction may be stored in the computer storage medium or transmitted from one computer storage medium to another computer storage medium, which may be transmitted wirelessly (e.g., cellular communication, infrared, short-range wireless, microwave, etc.) to another website site, computer, server or data center. The computer storage medium may be any available medium capable of being accessed by the computer or include one or more data storage devices integrated by an available medium, such as a server and a data center. The available medium may be a magnetic medium (for example, a floppy disk, a hard disk or a magnetic tape), an optical medium (for example, a DVD), a semiconductor medium (for example, an SSD), or the like.

Finally, it is to be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without making the essence of the corresponding technical solutions departing from the scope of the technical solutions of the embodiments of the present invention.

What is claimed is:

1. A data transmission method of an unmanned aerial vehicle system, the data transmission method comprising:
receiving, by a ground image transmission module, at least two data packets sent in parallel by terminal equipment, each data packet in the at least two data packets being transmitted to one module in the unmanned aerial vehicle system;
respectively caching, by the ground image transmission module, each data packet in the at least two data packets into a buffer queue corresponding to each data packet; and
transmitting, by the ground image transmission module, each of the data packets in the buffer queues to the module corresponding to the data packet through a communication channel between the modules corresponding to the data packets in the unmanned aerial vehicle system.

2. The data transmission method according to claim 1, wherein after respectively caching, by the ground image transmission module, each data packet in the at least two data packets into the buffer queue corresponding to each data packet, the data transmission method further comprises:
sending, by the ground image transmission module, a transmission instruction to the terminal equipment according to a data size of the data packets cached in the buffer queues, so that the terminal equipment adjusts a transmission rate of the data packets corresponding to the buffer queues according to the transmission instruction.

3. The data transmission method according to claim 2, wherein sending, by the ground image transmission module, the transmission instruction to the terminal equipment according to the data size of the data packets cached in the buffer queues comprises:
judging whether the data size of the data packets cached in the buffer queues is greater than a first threshold value or not;
in response to the data size of the data packets cached in the buffer queues is greater than or equal to the first threshold value, sending, by the ground image transmission module, a first transmission instruction to the terminal equipment, so that the terminal equipment reduces the transmission rate of the data packets corresponding to the buffer queues to be within a first rate range according to the first transmission instruction; and
in response to the data size of the data packets cached in the buffer queues is smaller than the first threshold value, sending, by the ground image transmission module, a second transmission instruction to the terminal equipment, so that the terminal equipment increases the transmission rate of the data packets corresponding to the buffer queues to be within a second rate range according to the second transmission instruction.

4. The data transmission method according to claim 3, wherein the data transmission method further comprises:
in response to the data size of the data packets cached in the buffer queues is greater than the first threshold value, judging whether the data size of the data packets cached in the buffer queues is greater than a second threshold value or not; and
in response to the data size of the data packets cached in the buffer queues is greater than or equal to the second threshold value, sending, by the ground image transmission module, a third transmission instruction to the terminal equipment, so that the terminal equipment reduces the transmission rate of the data packets corresponding to the buffer queues to be within a third rate range according to the third transmission instruction, wherein the second threshold value is greater than the first threshold value and the maximum value of the third rate range is smaller than the minimum value of the first rate range.

5. The data transmission method according to claim 3, wherein the data transmission method further comprises: judging whether the data size of the data packets cached in the buffer queues and a data size at a previous moment in the buffer queues are in the same threshold range or not; and
if not, judging whether the data size of the data packets cached in the buffer queues is greater than the first threshold value or not.

6. The data transmission method according to claim 5, wherein the data transmission method further comprises:
in response to the data size of the data packets cached in the buffer queues is smaller than the first threshold value and the data size at the previous moment in the buffer queues is greater than or equal to the first threshold value, sending, by the ground image transmission module, the second transmission instruction to the terminal equipment, so that the terminal equipment increases the transmission rate of the data packets corresponding to the buffer queues to be within the second rate range according to the second transmission instruction.

7. The data transmission method according to claim 5, wherein the data transmission method further comprises:
in response to the data size of the data packets cached in the buffer queues is greater than a third threshold value and the data size at the previous moment in the buffer queues is smaller than or equal to the third threshold value, or the data size of the data packets cached in the buffer queues is smaller than a fourth threshold value and the data size at the previous moment in the buffer queues is greater than or equal to the fourth threshold value, sending, by the ground image transmission module, the first transmission instruction to the terminal equipment, so that the terminal equipment reduces the transmission rate of the data packets corresponding to the buffer queues to be within the first rate range according to the first transmission instruction.

8. The data transmission method according to claim 1, wherein receiving, by the ground image transmission module, the at least two data packets sent in parallel by the terminal equipment comprises:
receiving, by the ground image transmission module, the at least two data packets sent in parallel by the terminal equipment through a USB channel.

9. A ground image transmission module, comprising:
a memory, configured to store a computer program; and
a processor, configured to execute the computer program to implement the data transmission method of the unmanned aerial vehicle system according to claim 1.

10. A data uploading system of an unmanned aerial vehicle, the data uploading system comprising:
a terminal equipment and an unmanned aerial vehicle system in communication connection, the unmanned aerial vehicle system comprising a ground system and an airplane system in communication connection, and the ground system comprising the ground image transmission module according to claim 9.

\* \* \* \* \*